(12) United States Patent
Celik et al.

(10) Patent No.: US 11,806,960 B2
(45) Date of Patent: Nov. 7, 2023

(54) SYSTEM FOR MANUFACTURING A SUPPORT STRUCTURE

(71) Applicant: The Goodyear Tire & Rubber Company, Akron, OH (US)

(72) Inventors: Ceyhan Celik, Stow, OH (US); Steven Amos Edwards, Akron, OH (US); Michael James Hogan, Tallmadge, OH (US); George Michael Stoila, Tallmadge, OH (US); James Alfred Benzing, II, North Canton, OH (US); Arun Kumar Byatarayanapura Gopala, Copley, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 319 days.

(21) Appl. No.: 17/111,741

(22) Filed: Dec. 4, 2020

(65) Prior Publication Data
US 2022/0176664 A1 Jun. 9, 2022

(51) Int. Cl.
*B29D 30/02* (2006.01)
*B29C 35/00* (2006.01)

(52) U.S. Cl.
CPC ............ *B29D 30/02* (2013.01); *B29C 35/007* (2013.01)

(58) Field of Classification Search
None
See application file for complete search history.

(56) References Cited

U.S. PATENT DOCUMENTS

| | | |
|---|---|---|
| 479,255 A | 7/1892 | Dunlop |
| 482,175 A | 9/1892 | Hollafolla |
| 1,002,003 A | 8/1911 | Simonson et al. |
| 1,233,722 A | 7/1917 | Smith |
| 1,389,285 A | 8/1921 | Althoff |
| 1,451,517 A | 4/1923 | Smith |
| 1,930,764 A | 10/1933 | Mallory |
| 3,493,027 A | 2/1970 | Dewhirst et al. |
| 4,226,273 A | 10/1980 | Long et al. |
| 4,235,270 A | 11/1980 | Kahaner et al. |
| 4,257,994 A | 3/1981 | Leblanc et al. |
| 4,602,823 A | 7/1986 | Berg |
| 5,343,916 A | 9/1994 | Duddey et al. |

(Continued)

OTHER PUBLICATIONS

European Search Report for Serial No. EP21211074 dated May 6, 2022.

(Continued)

*Primary Examiner* — Jacob T Minskey
*Assistant Examiner* — Adrien J Bernard
(74) *Attorney, Agent, or Firm* — June E. Rickey; Robert N. Lipcsik

(57) ABSTRACT

A system for curing a portion of a tire assembly includes: an axially placement shaft; a first actuator; a first retainer plate; a core on the axially placement shaft; a plurality of first inserts each axially and radially engaging a radially outer surface of the core with first ends of the first inserts axially engaging the first retainer plate; a plurality of second inserts each axially and radially engaging the radially outer surface of the core with first ends of the second inserts axially engaging the first retainer plate, each second insert disposed circumferentially between two of the plurality of first inserts; a second retainer plate; and a second actuator.

18 Claims, 17 Drawing Sheets

(56) References Cited

U.S. PATENT DOCUMENTS

| | | | |
|---|---|---|---|
| 5,800,643 A | 9/1998 | Frankowski | |
| 6,260,598 B1 | 7/2001 | Tanaka | |
| 8,061,398 B2 * | 11/2011 | Palinkas | B60C 17/061 |
| | | | 152/324 |
| 8,962,120 B2 | 2/2015 | Delfino et al. | |
| 10,406,852 B2 | 9/2019 | Celik et al. | |
| 10,457,094 B2 | 10/2019 | Celik et al. | |
| 10,486,462 B2 * | 11/2019 | Abe | B60C 9/26 |
| 10,603,956 B2 | 3/2020 | Celik et al. | |
| 2004/0069385 A1 | 4/2004 | Timoney et al. | |
| 2008/0303337 A1 | 12/2008 | Krantz | |
| 2010/0193097 A1 | 8/2010 | McNier et al. | |
| 2012/0205017 A1 | 8/2012 | Endicott | |
| 2014/0159280 A1 | 6/2014 | Martin et al. | |
| 2015/0210025 A1 | 7/2015 | Martin | |
| 2018/0133992 A1 | 5/2018 | Celik et al. | |
| 2018/0134072 A1 | 5/2018 | Celik et al. | |
| 2019/0152256 A1 | 5/2019 | Hwang et al. | |
| 2020/0047555 A1 | 2/2020 | Costlow et al. | |
| 2020/0376789 A1 * | 12/2020 | Lung | B60C 7/24 |

OTHER PUBLICATIONS

Translation of Notice of Allowance for Korean Serial No. 2021-0163962 dated Jun. 26, 2023.

* cited by examiner

SYSTEM FOR MANUFACTURING A SUPPORT STRUCTURE

FIELD OF INVENTION

The present invention relates to wheel/tire assemblies, and more particularly, to a system for manufacturing non-pneumatic wheel/tire assemblies.

BACKGROUND OF THE INVENTION

Radial pneumatic tires rely on the ply reinforcement to carry and transfer the load between the rim and the belt layer. These ply cords need to be tensioned to carry the load. Tensioning of these ply cords is achieved with the pressurized air in the inner chamber of the tire. If air pressure is lost, load carrying capacity of a pneumatic tire decreases significantly. Preventing the slow or sudden air pressure loss has been a challenge for the tire makers. One proposed solution is to use non-pneumatic tires. A top loader non-pneumatic tire can perform similar to a pneumatic tire if its durability, speed rating/limit and load capacity can be increased to the levels of a pneumatic tire.

Many top loader non-pneumatic tires rely on the polymeric spokes to carry the load of the vehicle. Spokes transfer the load from the rim to the shear band. Due to the characteristics of the polymeric materials used in the spokes of these tires, performance of these tires is limited. It is an object of the present invention to overcome this limitation and increase the load carrying capacity and durability of these spokes and hence the performance of the top loader non-pneumatic tire.

Definitions

As used herein and in the claims:

"Annular" means formed like a ring.

"Axial" and "axially" refer to lines or directions that are parallel to the axis of rotation of the tire.

"Circumferential" and "circumferentially" mean lines or directions extending along the perimeter of the surface of the annular tire parallel to the equatorial plane (EP) and perpendicular to the axial direction; it can also refer to the direction of the sets of adjacent circular curves whose radii define the axial curvature of the tread, as viewed in cross section.

"Equatorial plane (EP)" means the plane perpendicular to the tire's axis of rotation and passing through the center of its tread; or the plane containing the circumferential centerline of the tread.

"Inner" means toward the inside of the tire and "outer" means toward its exterior.

"Lateral" means an axial direction.

"Normal load" means the load assigned by the appropriate standards organization for the service condition for the tire.

"Radial" and "radially" mean directions radially toward or away from the axis of rotation of the tire.

"Spring rate" means the stiffness of tire expressed as the slope of the load deflection curve at a given pressure.

"Tread" means a molded rubber component which, when bonded to a tire casing, includes that portion of the tire that comes into contact with the road when the tire is normally inflated and under normal load.

"Tread element" or "traction element" means a rib or a block element.

"Tread width" means the arc length of the tread surface in a plane including the axis of rotation of the tire.

"Vertical deflection" means the amount that a tire deflects under load.

"Wheel" or "hub" means a structure for supporting the tire and mounting to the vehicle axle.

SUMMARY OF THE INVENTION

A system in accordance with the present invention for curing a portion of a tire assembly includes: an axially placement shaft; a first actuator slid onto the axial placement shaft; a first retainer plate adjacent the first actuator on the axially placement shaft; a core on the axially placement shaft; a plurality of first inserts each axially and radially engaging a radially outer surface of the core with first ends of the first inserts axially engaging the first retainer plate; a plurality of second inserts each axially and radially engaging the radially outer surface of the core with first ends of the second inserts axially engaging the first retainer plate, each second insert disposed circumferentially between two of the plurality of first inserts; a second retainer plate securing opposite second parts of the first inserts and opposite second parts of the second inserts to the axial placement shaft; and a second actuator slid on to the axial placement shaft.

According to another aspect of the system, the first actuator and the second actuator compress the first inserts and corresponding parts of the tire assembly together.

According to still another aspect of the system, the first retainer plate and the second retainer plate secure the first inserts to the core.

According to yet another aspect of the system, the first retainer plate and the second retainer plate orient a plurality of rubber sheets of the tire assembly with the core.

According to still another aspect of the system, the first inserts have internal channels for contributing to the curing of parts of the tire assembly.

According to yet another aspect of the system, the first inserts are shaped to assist shaping of parts of the tire assembly.

According to still another aspect of the system, internal channels of the first inserts are heated to an appropriate curing temperature for the tire assembly.

According to yet another aspect of the system, internal channels of the first inserts are heated by a hot liquid.

According to still another aspect of the system, internal channels of the first inserts are heated by steam.

According to yet another aspect of the system, internal channels of the first inserts are heated by electricity.

A method in accordance with the present invention cures a portion of a tire assembly. The method includes the steps of: coaxially securing a lower retainer plate to a lower actuator; coaxially securing a core to the lower retainer plate; coaxially securing a plurality of larger inserts and corresponding parts of the tire assembly to the lower retainer plate and the radially outer surface of the core; circumferentially securing a plurality of smaller inserts between the larger inserts and the corresponding parts of the tire assembly to the radially outer surface of the core; coaxially securing alternating larger and smaller inserts to an upper retainer plate; coaxially securing an upper actuator to the upper retainer plate; and axially compressing alternating larger and smaller inserts and corresponding parts of the tire assembly between the lower actuator and the upper actuator.

According to another aspect of the method, the method includes a further step of heating internal channels of the larger inserts by a hot liquid.

According to still another aspect of the method, the method includes a further step of coaxially securing the upper retainer plate to alternating larger inserts and smaller inserts.

According to yet another aspect of the method, the method includes a further step of radially and circumferentially securing the larger inserts and smaller inserts to the core.

According to still another aspect of the method, the method includes a further step of appropriately positioning the corresponding parts of the tire assembly relative to each other.

According to yet another aspect of the method, the method includes a further step of applying heat to the core and the larger inserts.

According to still another aspect of the method, the method includes a further step of cooling the core and the larger inserts.

According to yet another aspect of the method, the method includes a further step of axially releasing the upper actuator and the lower actuator.

According to still another aspect of the method, the method includes a further step of disengaging the upper actuator and the lower actuator from an axial placement shaft.

According to yet another aspect of the method, the method includes a further step of revealing a cured single-piece structure made from cured together parts of the tire assembly.

BRIEF DESCRIPTION OF THE DRAWINGS

The present invention will be more clearly understood by the following description of some examples thereof, with reference to the accompanying drawings, in which.

DESCRIPTION OF EXAMPLES OF THE PRESENT INVENTION

A conventional wheel/tire assembly may have an outer ring, such as a shear band, flexibly connected to a central hub by means of lightweight composite springs. The springs may be plates fixed to the ring and to the hub. The hub may contain a speed reduction gear unit and/or an electric motor and may have a suspension mechanism for connecting a vehicle chassis to each wheel. The ring may be constructed from a flexible composite material, such as carbon fiber reinforced nylon material and have twin rubber tires and a plurality of circumferentially spaced-apart radial cleats which engage the ground and provide improved traction. The hub may also be formed from a carbon fiber reinforced composite material. Another conventional wheel may have a rubber strip with a molded tread bonded to a composite ring for improved grip. Further, the springs interconnecting the ring and hub may be S-shaped lightweight composite springs.

Another conventional wheel/tire assembly may be formed from a lightweight composite material, such as carbon fiber reinforced polyamide. The assembly may have a cylindrical central hub and a circular outer flexible rim mounted on the central hub by an endless looped spring band extending between the central hub and the circular rim. Six radial loops may be defined by the spring band. The spring band may be attached to the central hub and to the circular rim by any suitable means, such as adhesion, cohesion, soldering and/or mechanical fixing by means of bolts, rivets, and/or clamps.

Figure 20:
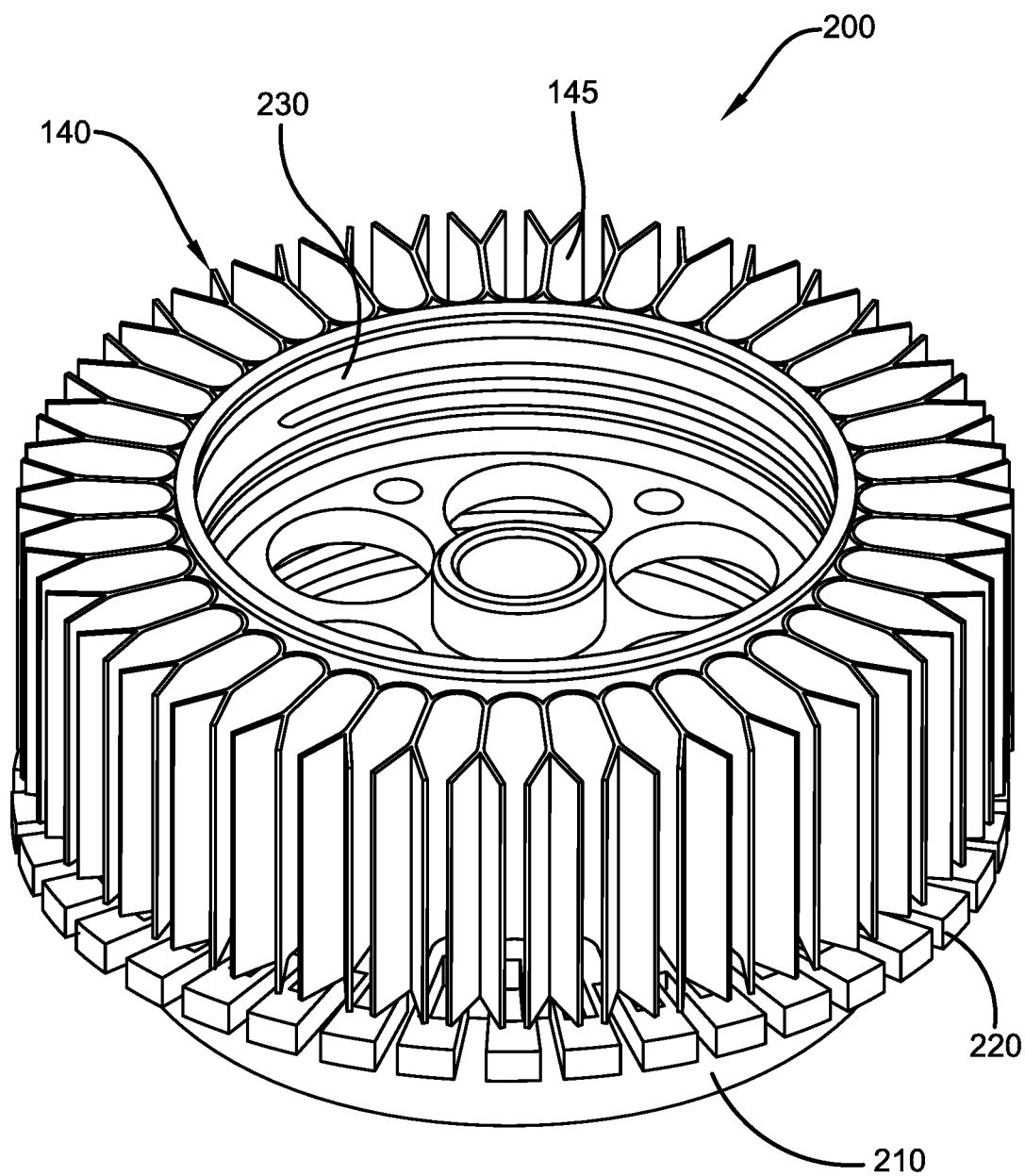
FIG. 20 is a schematic perspective view of the assembly of FIG. 17 with part of a tire structure.
Figure 21:
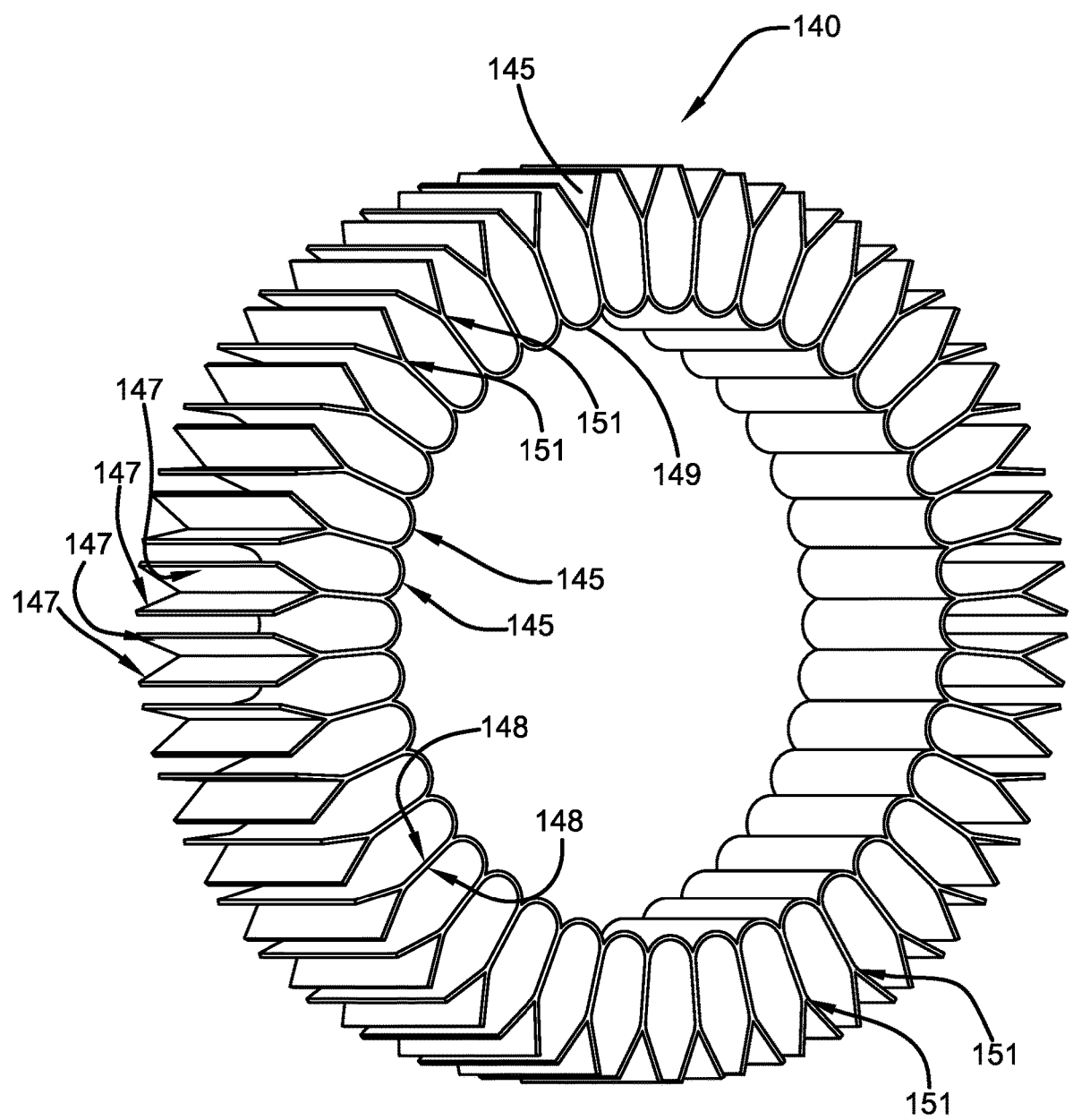
FIG. 21 is a schematic perspective view of the part of the tire assembly of 20.

As shown in FIGS. 20-21, an example tire assembly, such as that described in Applicant's US Patent Application Publication Number US 2018/0134072, incorporated herein by reference in its entirety, may be formed from a lightweight polymer material, such as, for example, a standard tire rubber compound, a thermoplastic polymer, polyethylene terephthalate (PET), polyether ether ketone (PEEK), a cross-linking polymer like natural rubber, synthetic rubber-like polymers, epoxy resins, and/or phenolic resins. The assembly may have an inner central rim, such as an automobile wheel (not shown), and a circular outer flexible ring, which may include a shear band and tread structure, mounted on the inner central rim by a continuous cord/fabric reinforced spoke structure extending between the inner central rim and the outer ring.

The spoke structure may define a plurality of cavities disposed concentrically about the inner central rim allowing the spoke structure to deflect under load thereby defining a suitable balance between flexibility for ride comfort and traction within a footprint of the assembly and stiffness for vehicle handling, low rolling resistance, and low heat build-up within the spoke structure. The cavities of the spoke structure may further define openings for arms of the inner central rim to extend therethrough and secure the spoke structure to the inner central rim. The arms may engage portions in a mechanical interlocking arrangement. The inner central rim may further include plates that, along with the arms may sandwich the portions of the spoke structure and create a further frictional and/or adhesive securement between the inner central rim and the spoke structure. The spoke structure may comprise a homogenous or heterogeneous polymer and/or a filled polymer.

Spokes of the spoke structure may be curved inwardly or outwardly for mitigating or enhancing buckling of the spokes. The spokes may include one or more reinforcing layers. The layer(s) may be constructed of single end dipped cords, conventional pneumatic tire ply/cord arrangements, short fibers, and/or polymeric film. Further, these constructions may be PET, nylon 6, nylon 6,6, rayon, steel, glass fibers, carbon fiber, aramid, and/or a hybrid construction of these materials. The cords may be from 400 denier to 9000 denier. The polymeric film may be from 0.1 mm to 2.0 mm thick. The spokes may be oriented at angle between 0 degrees and 90 degrees. The reinforcement of the spokes may be continuously reinforced across their entire axial length. Continuous reinforcement layer(s) may extend radially outward to multiple locations adjacent to a shear band at the outer flexible ring.

Each cavity may have a common cross-sectional profile about the axis of rotation of the assembly. Further, each cavity may have a common axial length equal to a uniform axial thickness of the spoke structure. Each cavity may be curvedly shaped to prevent "pinch" points on the reinforcement layer(s) and mitigate compressive stress concentrations on the reinforcement layer(s). The number of cavities may be between 2 and 60 for large scale tire assemblies. The inner central rim may include steel, cast iron, aluminum, aluminum alloys, magnesium allows, and/or iron alloys.

FIGS. 1-21 show a system 200 in accordance with the present invention for curing and manufacturing pneumatic and/or non-pneumatic tire assemblies 140. The system 200 may include an axially placement shaft 205, a first lower actuator 210 slid onto the axial placement shaft 205, a first lower retainer plate 220 adjacent the first lower actuator 210 on the axially placement shaft 205, an annular or toroidal core 230 on the axially placement shaft 205, a plurality of first larger inserts 240 each axially and radially engaging a radially outer surface of the core 230 and first lower retainer plate 220 and securing/orienting a plurality of rubber sheets, or first parts 145 of the tire assembly 140, to/with the core 230 and lower retainer plate 220, a plurality of second smaller inserts 250 each axially and radially engaging the radially outer surface of the core 230 and located circumferentially between two of the plurality of first larger inserts 240 and first parts 145, a second upper retainer plate 260 securing upper parts of the first inserts 240 and second inserts 250 to the core 230 on the axially placement shaft 205, and a second upper actuator 270 on the axially placement shaft 205.

Figure 1:
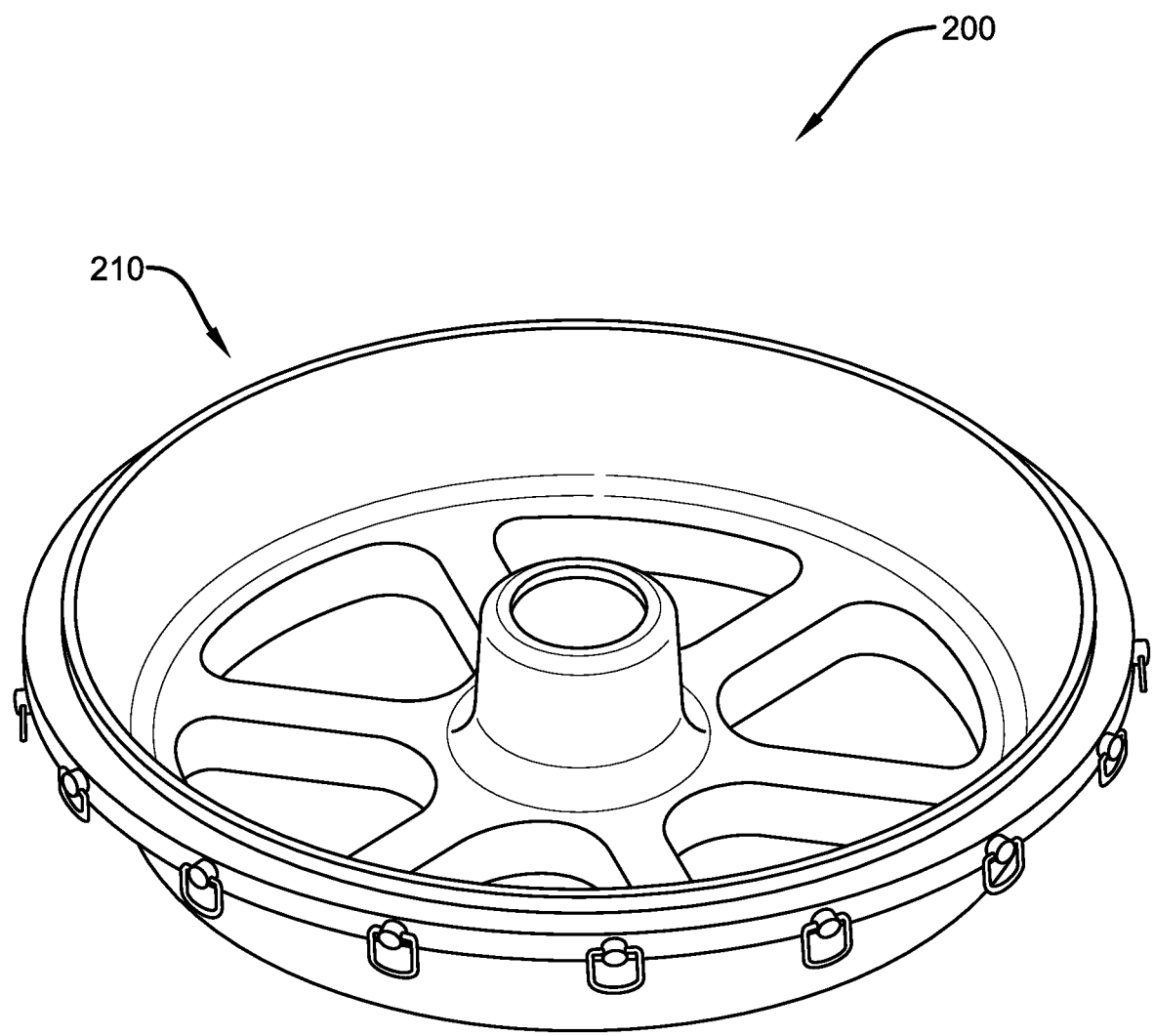
FIG. 1 is a schematic perspective view of a first part of an example wheel/tire assembly in accordance with the present invention.
Figure 2:
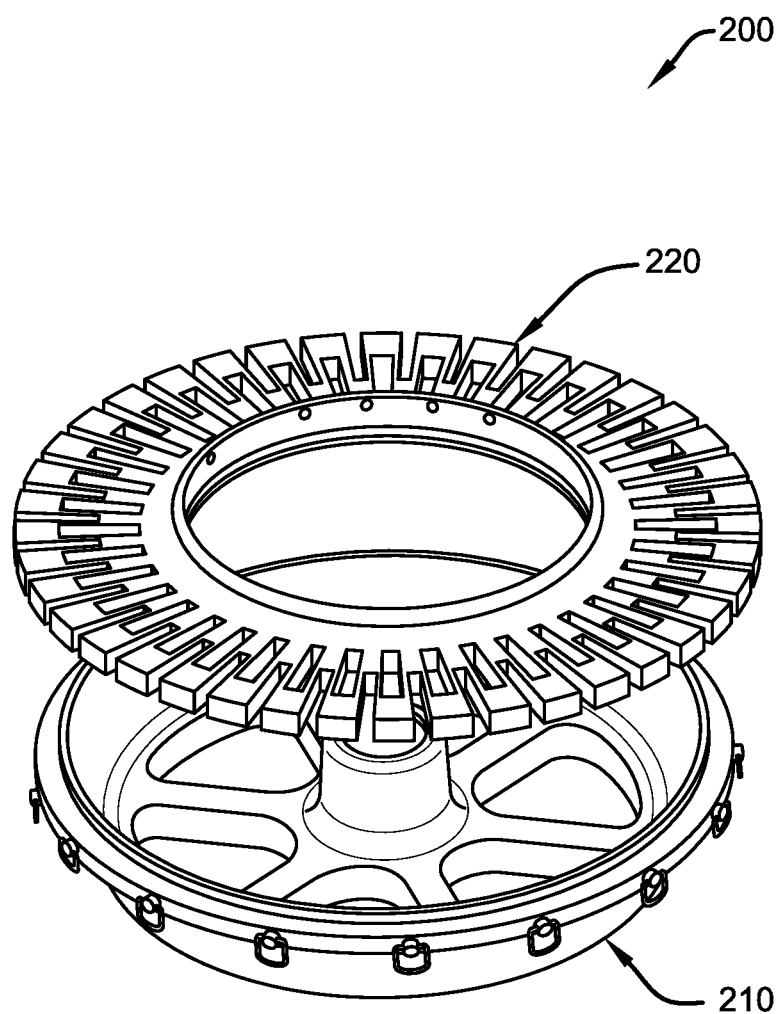
FIG. 2 is another schematic perspective view of part of the assembly of FIG. 1.
Figure 3:
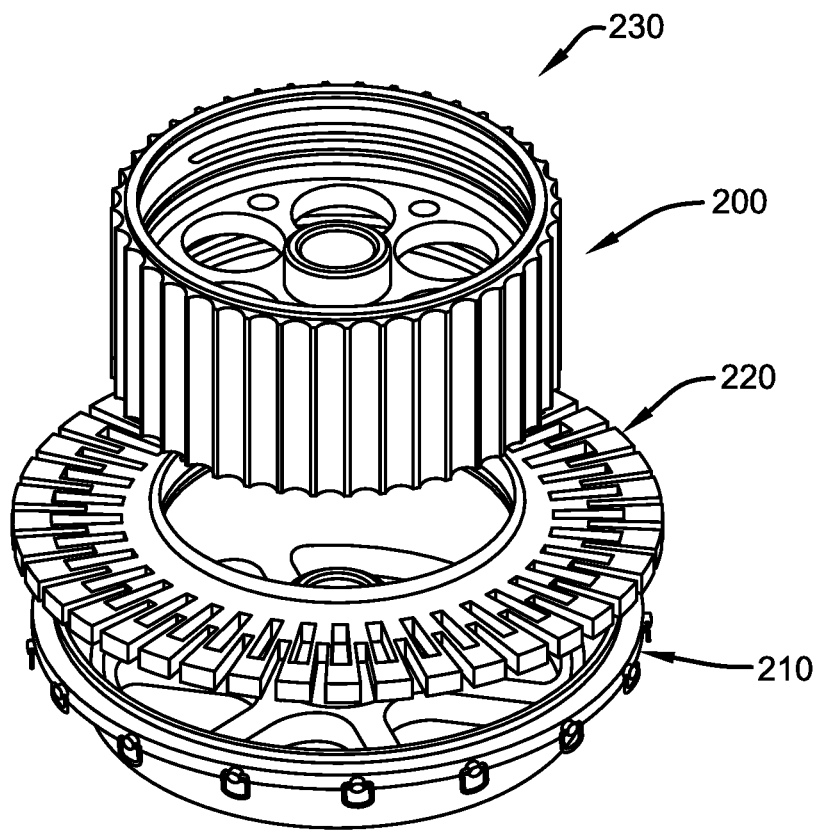
FIG. 3 is a schematic perspective view of still another part of the wheel assembly of FIG. 1.
Figure 4:
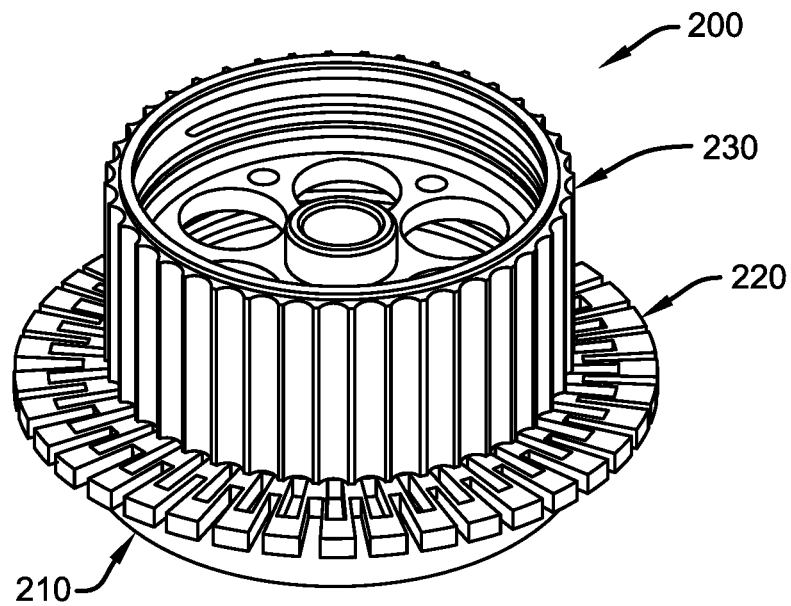
FIG. 4 is a schematic perspective view of yet another part of the wheel assembly of FIG. 1.
Figure 5:
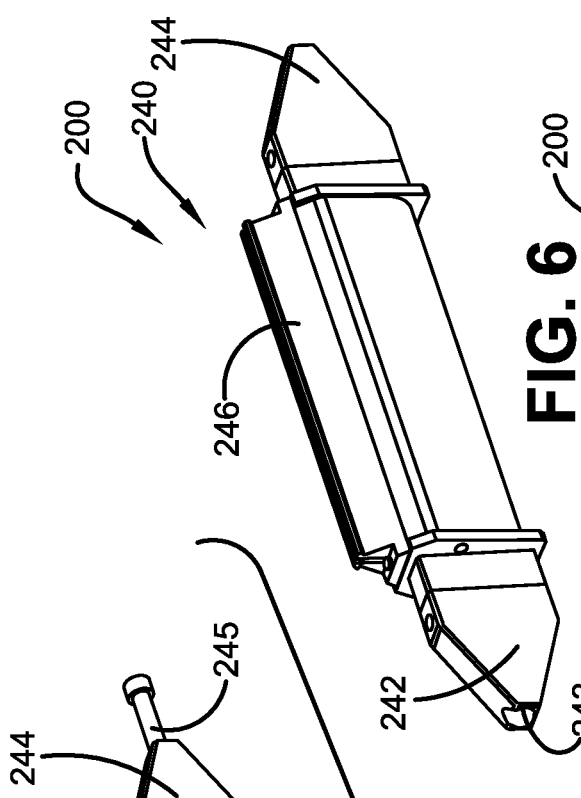
FIG. 5 is a schematic perspective view of the still another part of the wheel assembly of FIG. 1.
Figure 6:
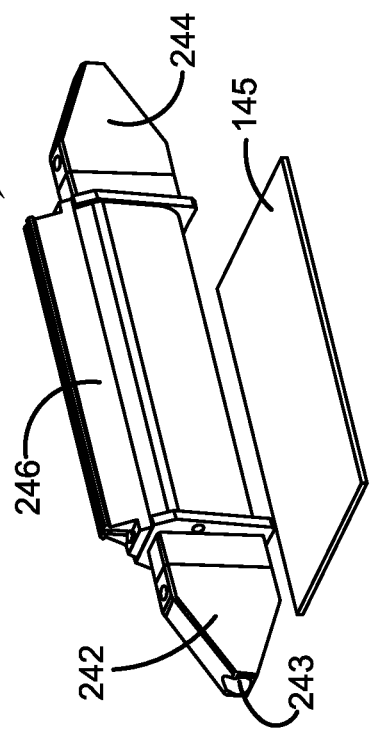
FIG. 6 is another schematic perspective view of the part of FIG. 5.
Figure 7:
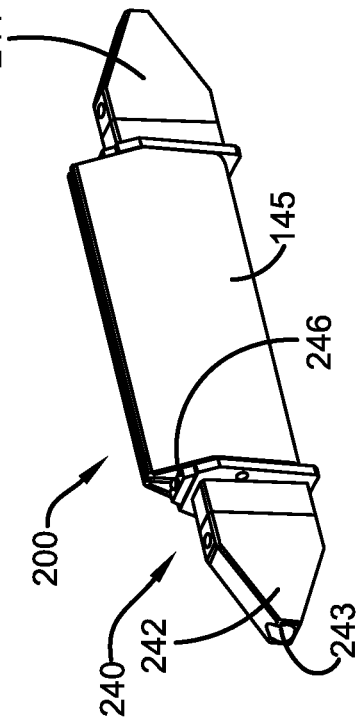
FIG. 7 is still another schematic perspective view of the part of FIG. 5.
Figure 12:
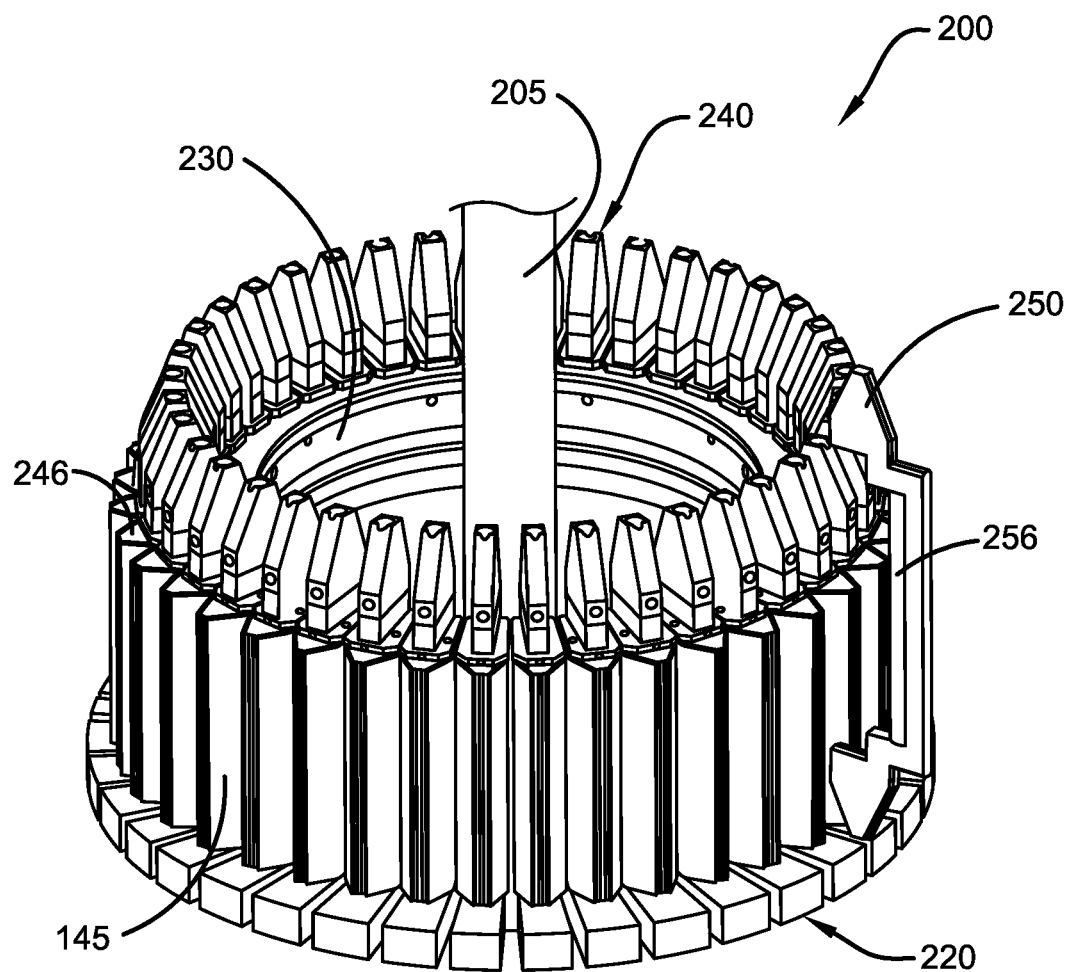
FIG. 12 is a schematic perspective view of a still more complete assembly of the parts of FIGS. 1-8.
Figure 13:
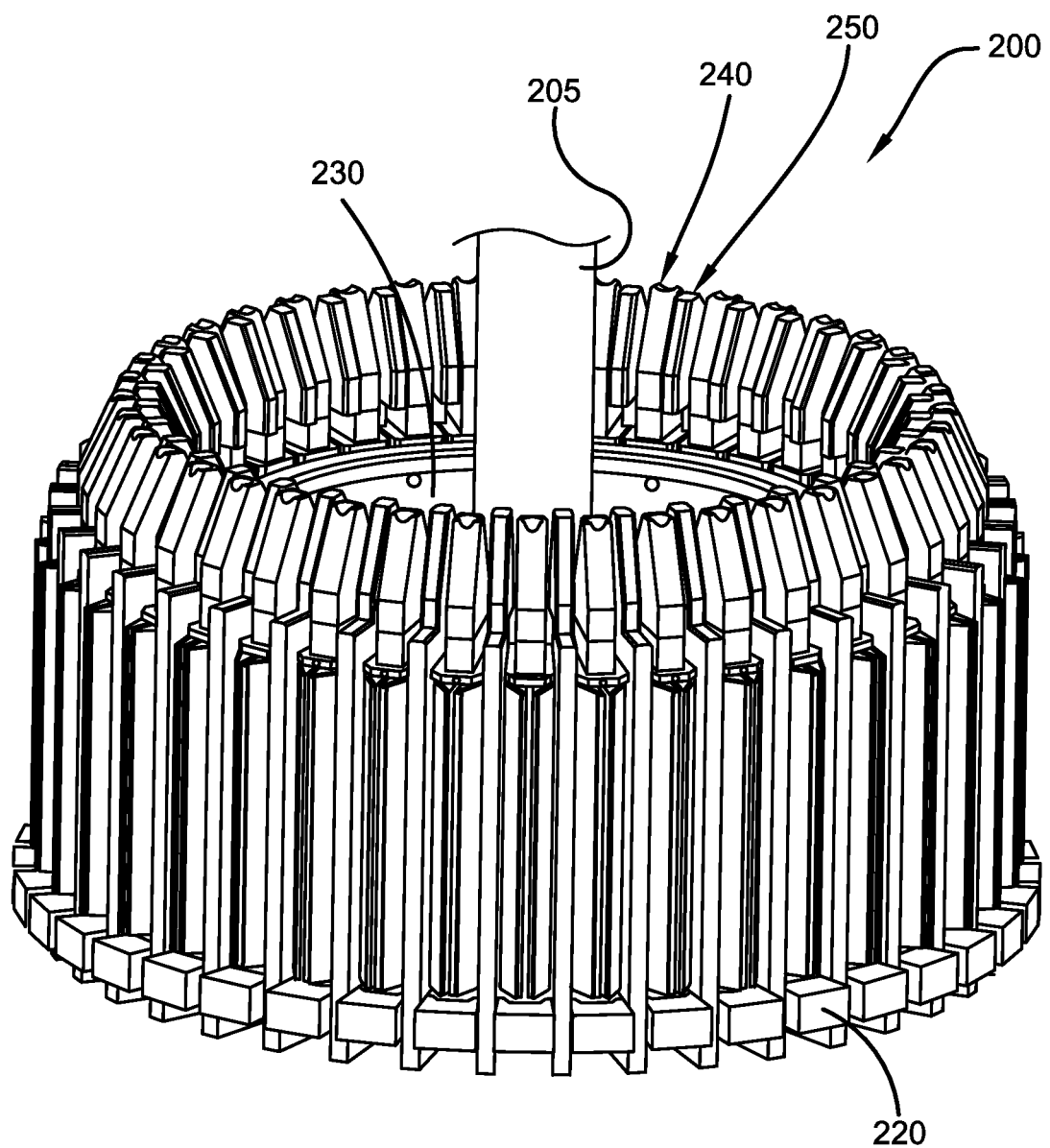
FIG. 13 is a schematic perspective view of a yet more complete assembly of the parts of FIGS. 1-8.
Figure 14:
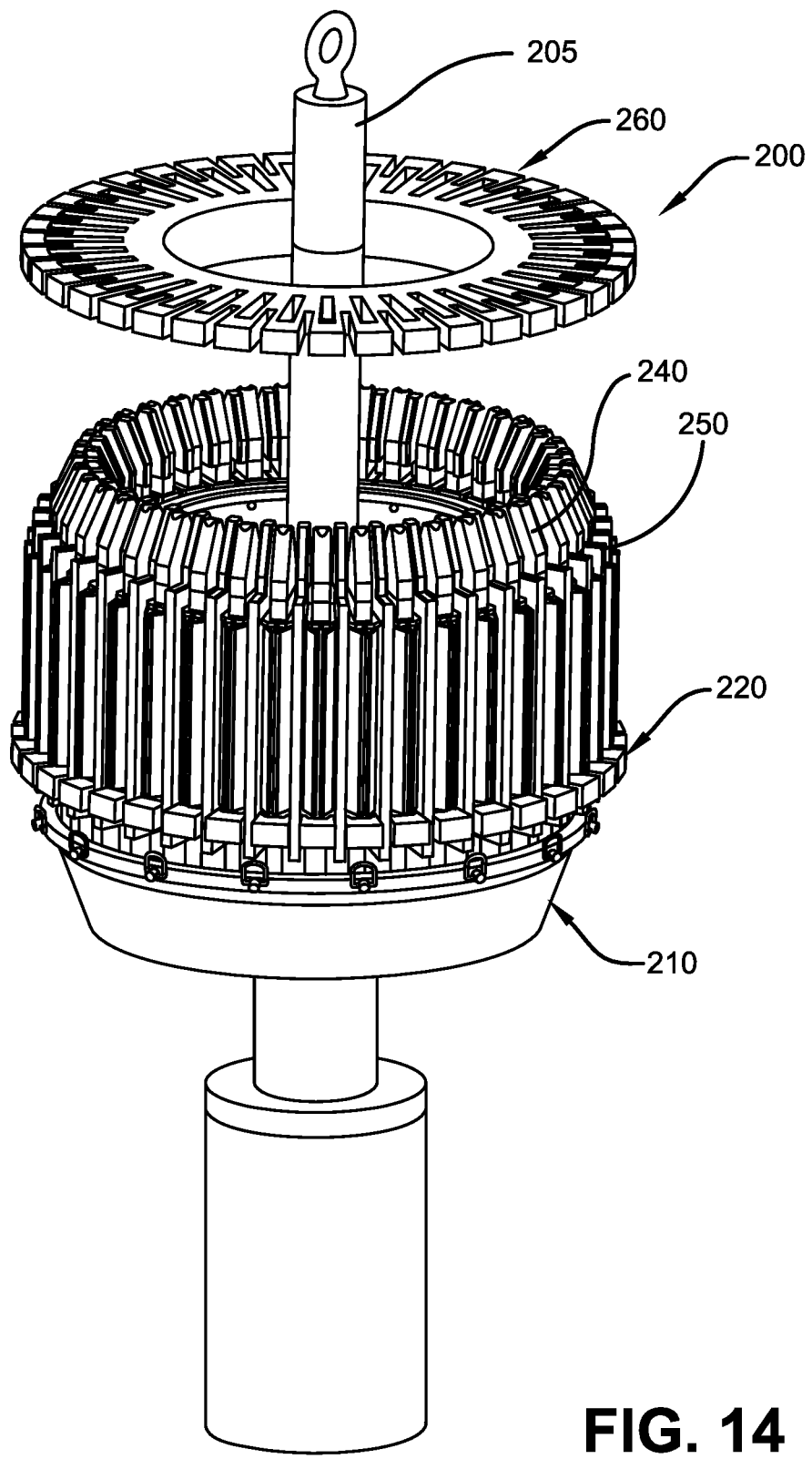
FIG. 14 is an exploded schematic perspective view of the assembly of FIG. 13 with additional parts from FIGS. 1-8.
Figure 15:
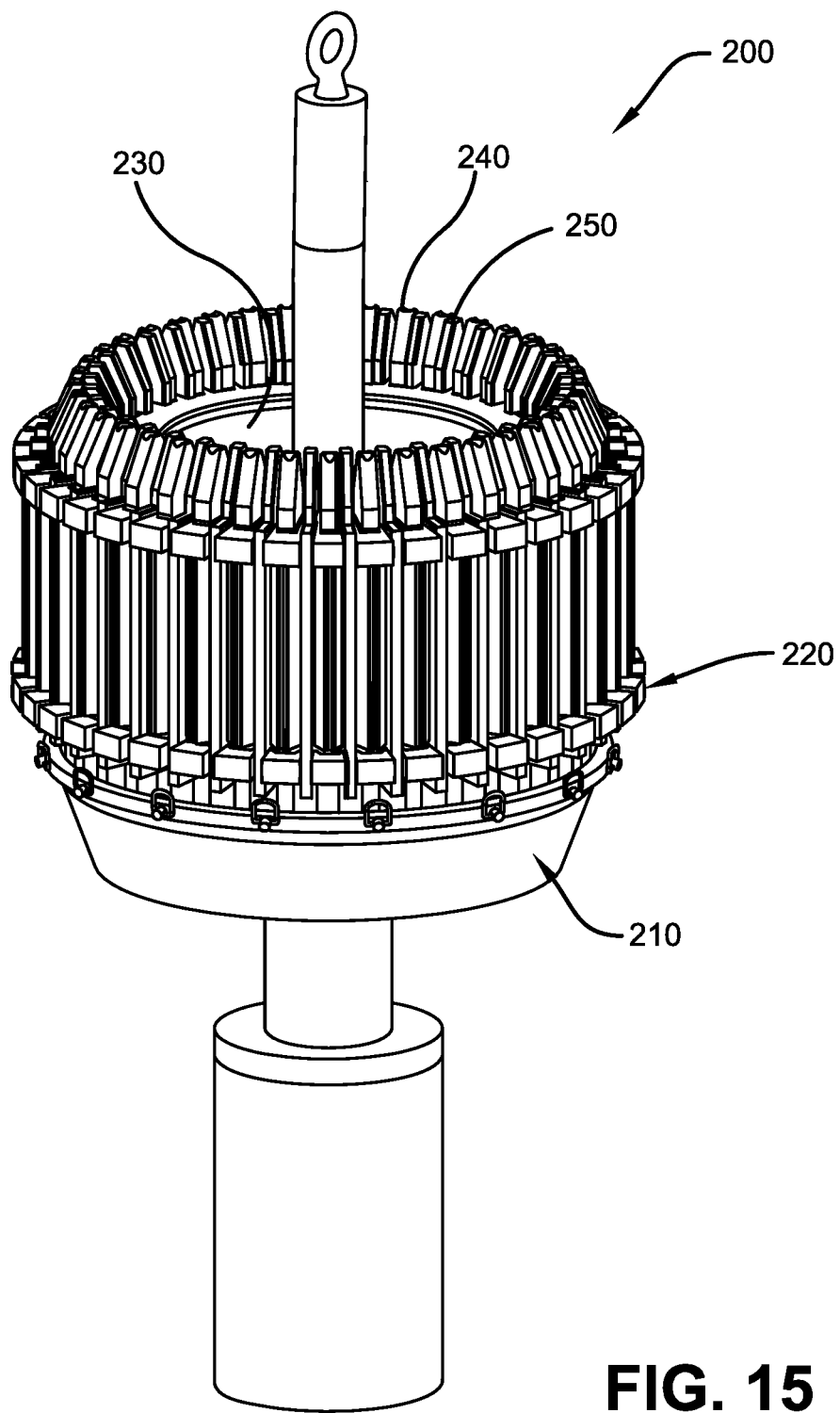
FIG. 15 is a more complete schematic perspective view of the assembly of FIG. 13 with additional parts from FIGS. 1-8.
Figure 16:
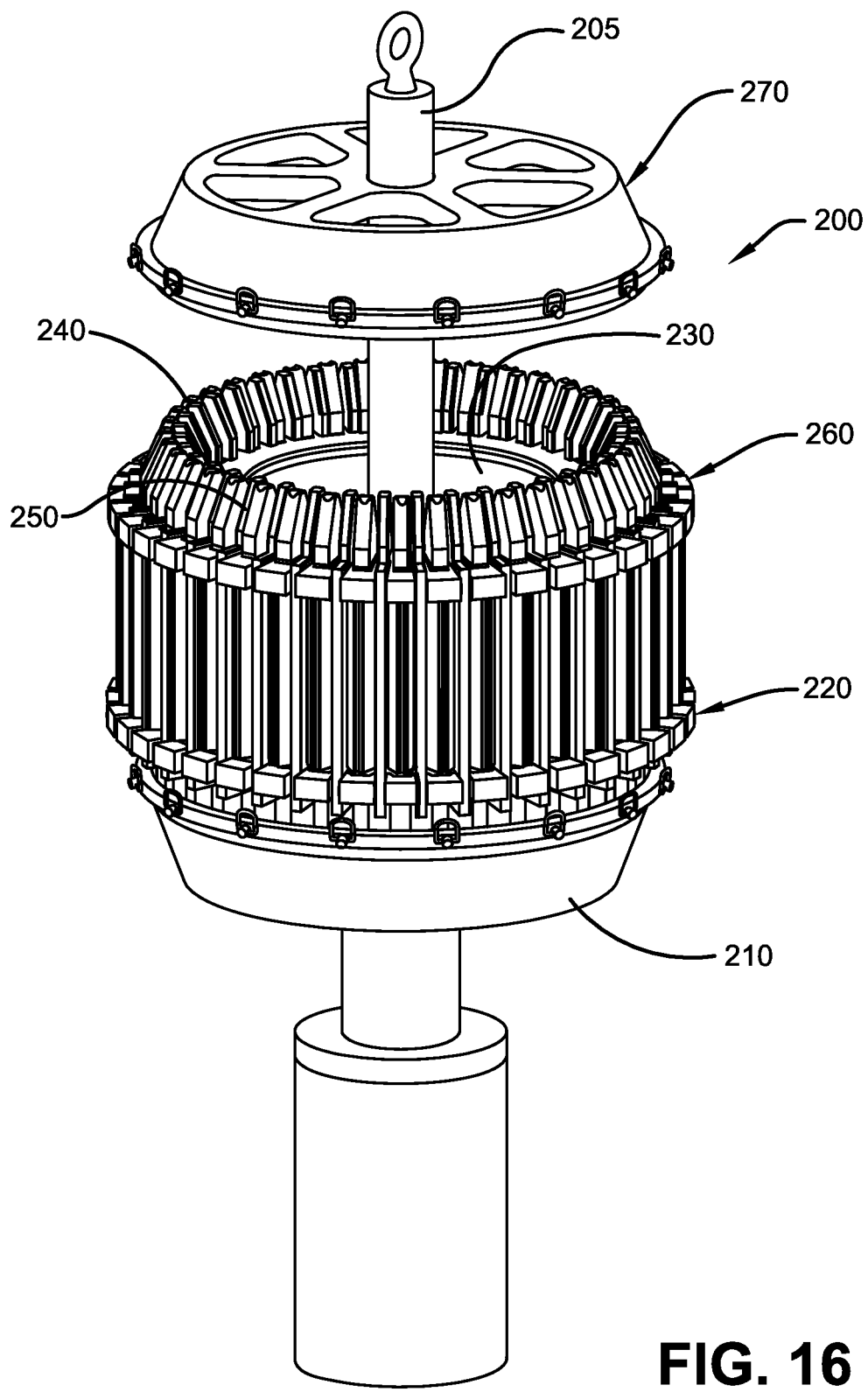
FIG. 16 is an exploded schematic perspective view of the assembly of FIG. 15 with additional parts from FIGS. 1-8.
Figure 17:
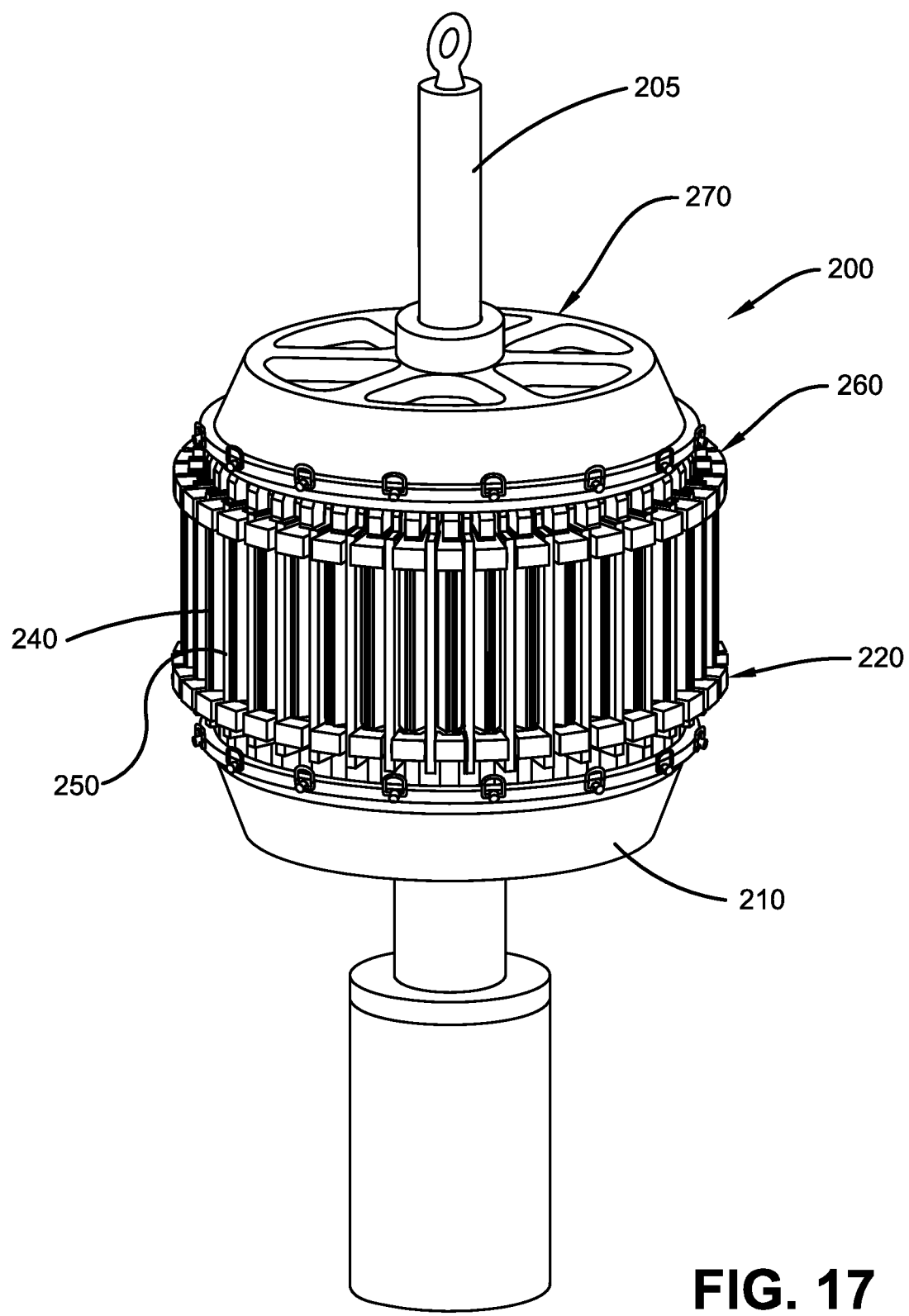
FIG. 17 is a more complete schematic perspective view of the assembly of FIG. 15 with additional parts from FIGS. 1-8.
Figure 18:
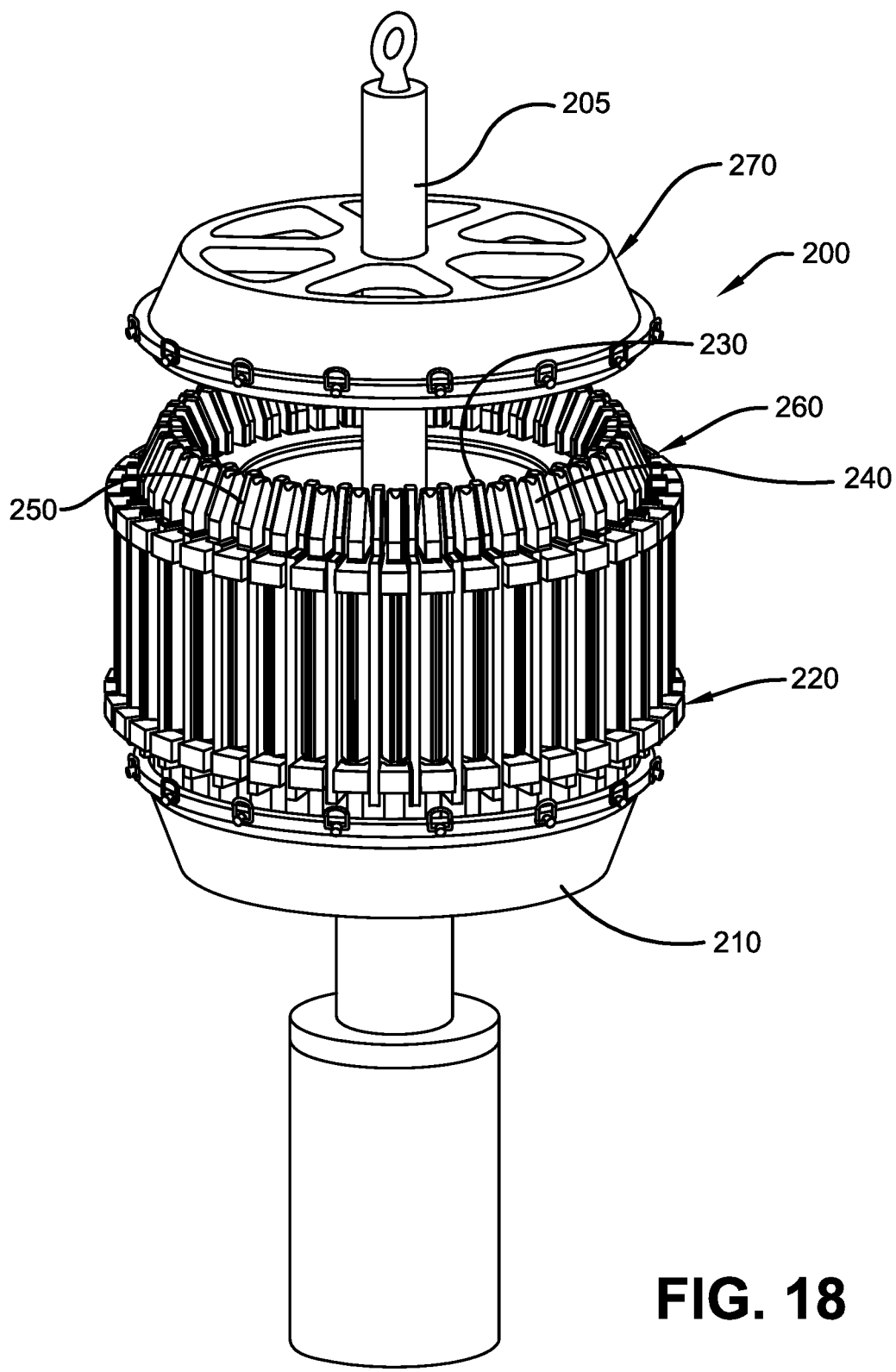
FIG. 18 is an exploded schematic perspective view of the assembly of FIG. 17 with additional parts from FIGS. 1-8.
Figure 19:
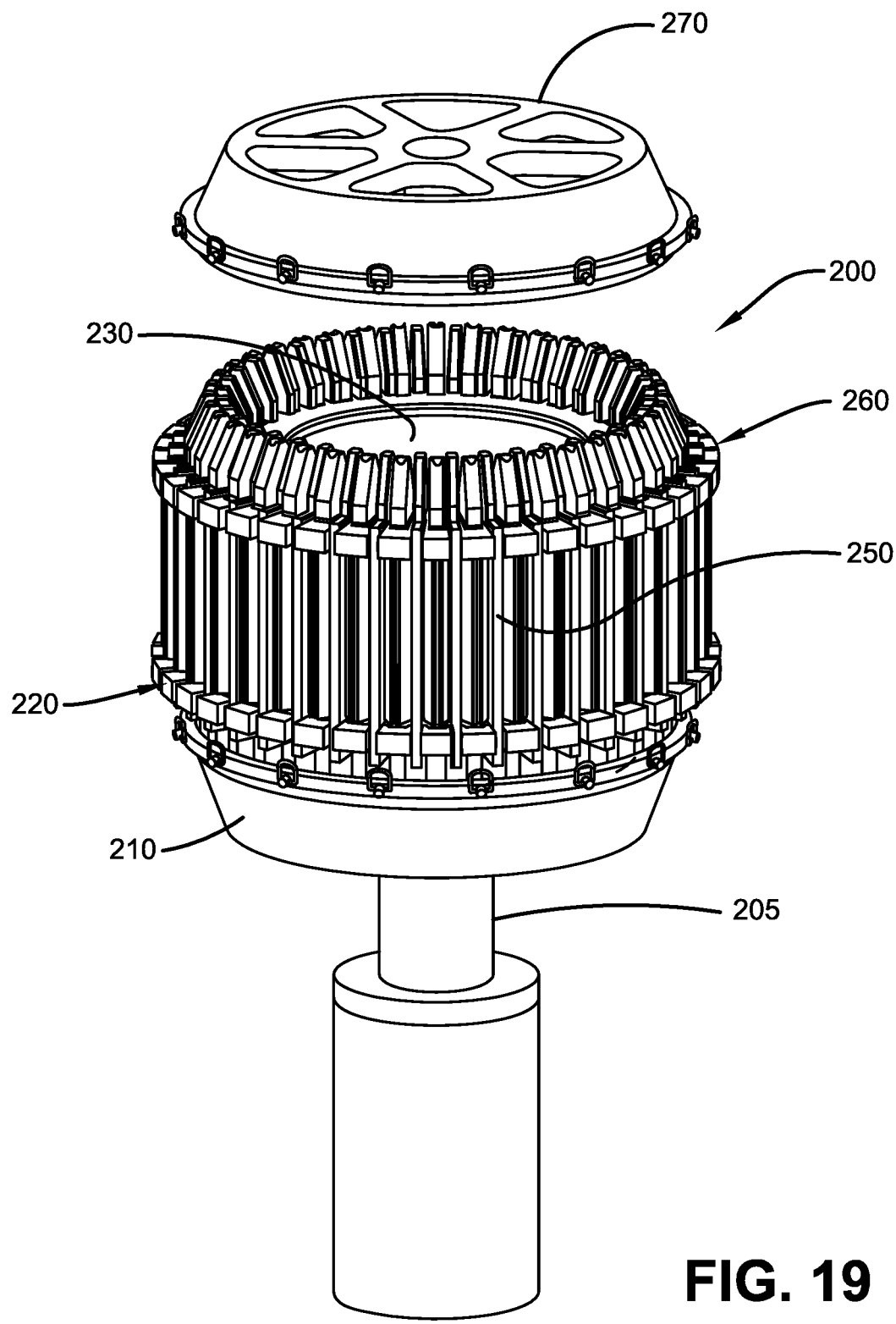
FIG. 19 is a more complete schematic perspective view of the assembly of FIG. 17 with additional parts from FIGS. 1-8.
Figure 22:
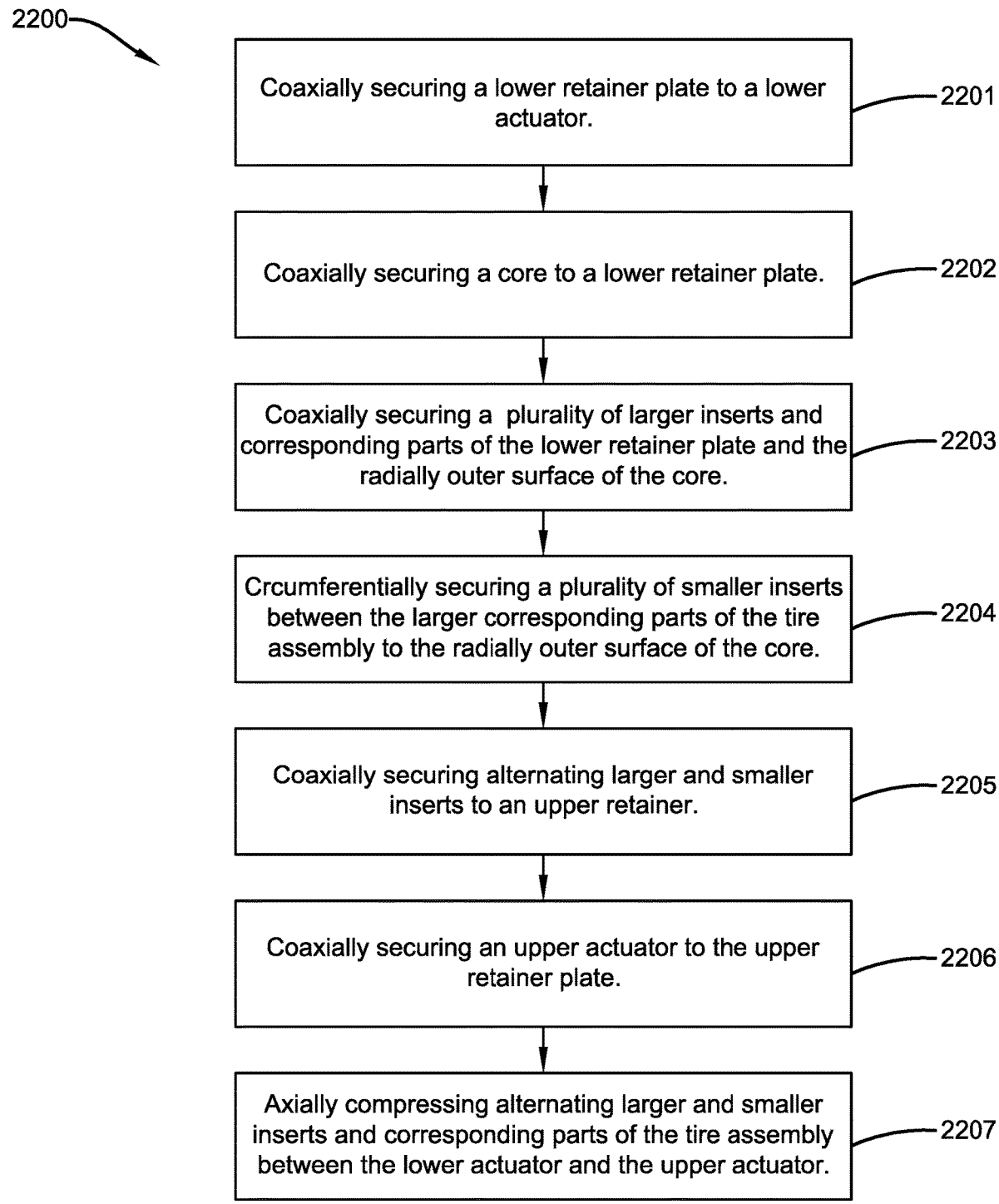
FIG. 22 is a schematic flow chart of an example method in accordance with the present invention.

As shown in the FIG. 22, a method 2200 for partially curing the tire assembly 140, in accordance with the present invention, may include a first step 2201 such that the lower retainer plate 22 may be secured coaxially to the lower actuator 210 (FIGS. 1-2). In a second step 2202, the core 230 may be secured coaxially to the lower retainer plate 220 (FIGS. 3-4). In a third step 2203, the larger inserts 240 and corresponding first parts 145 may be secured coaxially to the lower retainer plate 220 and the radially outer surface of the core 230 (FIGS. 5-11). In a fourth step 2204, the smaller insert 250 may be secured circumferentially between the larger inserts/parts 240, 145 to the lower retainer plate 220 and the radially outer surface of the core 230 (FIGS. 12-13). In a fifth step 2205, the upper retainer plate 260 may be secured coaxially to the alternating larger inserts 240 and smaller inserts 250 (FIGS. 14-15). In a sixth step 2206, the upper actuator 270 may be secured coaxially to the upper retainer plate 270 (FIG. 16). In a seventh step 2207, the lower actuator 210 and upper actuator 270 may be axially compressed such that the larger inserts 240 and smaller inserts 250 are radially and circumferentially secured and positioned against the core 230 (FIG. 17). In an eighth step 2208, the appropriately positioned plurality of parts 145 of the tire assembly 140 may be cured to each other by applying heat to the core 230 and larger inserts 240 (FIG. 17). In a ninth step 2209, the core 230 and larger inserts 240 may be cooled and the lower actuator 210 and upper actuator 270 may be axially released and disengaged from the remaining structures 220, 230, 240, 250, 260 (FIGS. 18-19). In a tenth step 2210, the upper retainer plate 260, larger inserts 240, and smaller inserts 250 may be removed from the core 230 (FIG. 20). In an eleventh step 2211, the lower actuator 210, the lower retainer plate 220, and core 230 may be removed to reveal a cured single-piece structure made from the cured together parts 140 of the tire assembly 140 (FIGS. 20-21).

Figure 8:
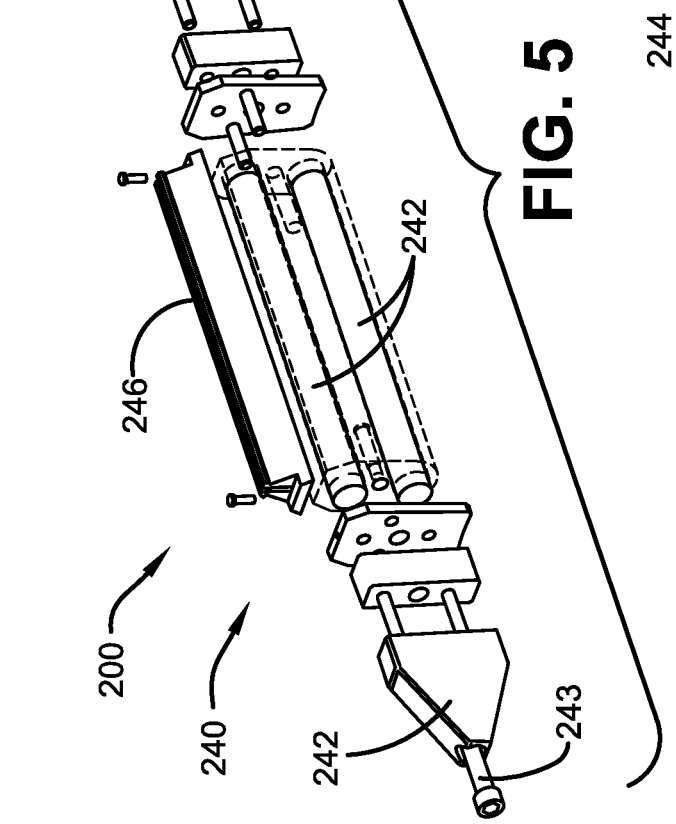
FIG. 8 is yet another schematic perspective view of the part of FIG. 5.
Figure 9:
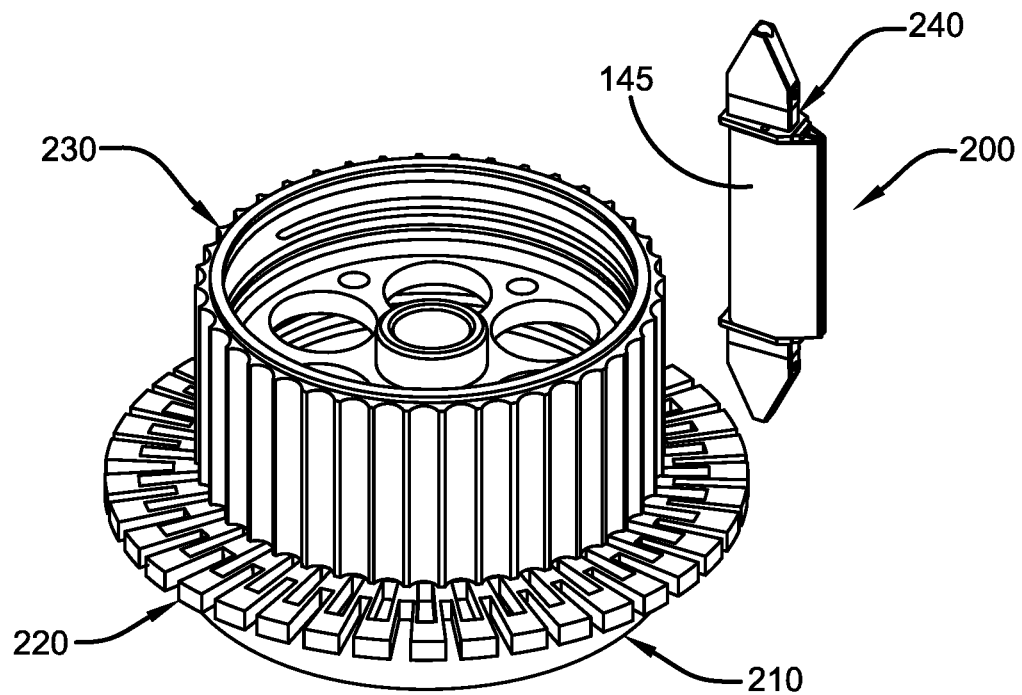
FIG. 9 is an exploded schematic perspective view of the parts of FIGS. 1-8.
Figure 10:
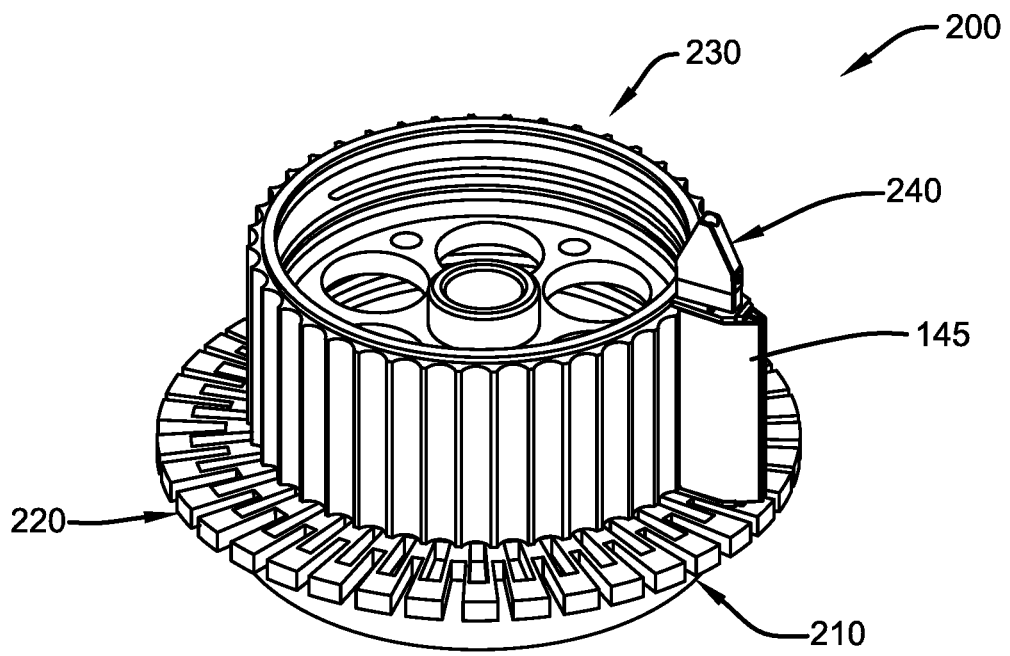
FIG. 10 is a schematic perspective view an assembly of the parts of FIGS. 1-8.
Figure 11:
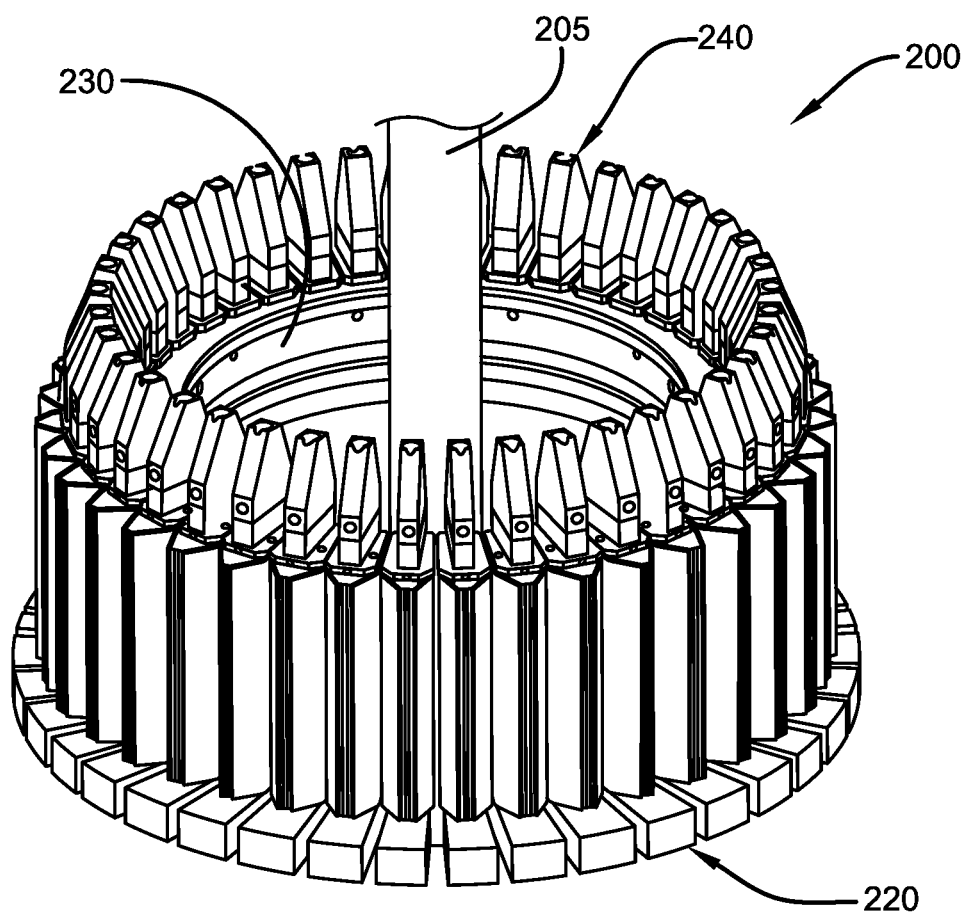
FIG. 11 is a schematic perspective view of a more complete assembly of the parts of FIGS. 1-8.

As shown in FIGS. 5-8, the larger inserts 240 may have internal channels 242 for contributing to the curing of the parts 145 of the tire assembly 140. The channels 242 may have any suitable cross-section, such as circle, rectangle, square, pentagon, etc. The larger inserts 240 may further be shaped to further assisting shaping of the parts 145 (FIG. 8). The channels 242 (upper and lower) may be heated to an appropriate curing temperature by any suitable means, such as steam, electricity, hot pressurized water, etc. The channels 242 may be secured at opposite ends by a first end wedge 244 and a second end wedge 246. The wedges 244, 246 may transfer a heating medium (e.g., hot liquid, steam, electricity, etc.) through first and second internal tubes 243, 245.

The larger inserts 240 may further include elongated, triangular first insulator members 246 at a radially outer part of the larger inserts. The smaller inserts 250 may further include elongated, rectangular second insulator members 252. During curing of each part 145 of the tire assembly 140 to circumferentially adjacent parts 145 (FIG. 21), these first and second insulator members 246, 256 together enable radially outer flap members 147 of the parts 145 to remain apart and uncured. These flap members 147 will thus be available for curing to other radially outer parts (not shown) of the tire assembly 140.

More specifically, as shown in FIG. 21, this results in the multiple U-shaped parts 145 forming a one-piece, integrated configuration of the parts with uncured radially outer flap members 147 and radially extending parts 148 cured to circumferentially adjacent radially extending parts 148 and radially inner curved parts 149 interconnecting the radially extending parts 148 (FIG. 21). Therefore, adjacent parts 145 together form multiple Y-shaped junctions 151 between each adjacent part 145 of the tire assembly 140.

Variations in the present invention are possible in light of the description of it provided herein. While certain representative examples and details have been shown for the purpose of illustrating the present invention, it will be apparent to those skilled in this art that various changes and/or modifications may be made therein without departing from the scope of the present invention. It is, therefore, to be understood that changes may be made in the particular examples described herein, which will be within the full scope of the present invention as defined by the following appended claims. Further, the present invention is not limited to the examples hereinbefore described, which may be varied in construction and/or detail within the full scope of the appended claims.

What is claimed:

1. A system for curing a portion of a tire assembly includes:
   an axial placement shaft;
   a first actuator slid onto the axial placement shaft;
   a first retainer plate adjacent the first actuator on the axial placement shaft;
   a core on the axial placement shaft;
   a plurality of first inserts each axially and radially engaging a radially outer surface of the core with first ends of the first inserts axially engaging the first retainer plate; wherein the first inserts have internal channels for contributing to the curing of parts of the tire assembly;
   a plurality of second inserts each axially and radially engaging the radially outer surface of the core with first ends of the second inserts axially engaging the first retainer plate, each second insert disposed circumferentially between two of the plurality of first inserts;
   a second retainer plate securing opposite second parts of the first inserts and opposite second parts of the second inserts to the axial placement shaft; and
   a second actuator slid on to the axial placement shaft.

2. The system as set forth in claim 1 wherein the first actuator and the second actuator compress the first inserts and corresponding parts of the tire assembly together.

3. The system as set forth in claim 1 wherein the first retainer plate and the second retainer plate secure the first inserts to the core.

4. The system as set forth in claim 1 wherein the first retainer plate and the second retainer plate orient a plurality of rubber sheets of the tire assembly with the core.

5. The system as set forth in claim 1 wherein the first inserts are shaped to assist shaping of parts of the tire assembly.

6. The system as set forth in claim 1 wherein internal channels of the first inserts are heated to an appropriate curing temperature for the tire assembly.

7. The system as set forth in claim 1 wherein internal channels of the first inserts are heated by a hot liquid.

8. The system as set forth in claim 1 wherein internal channels of the first inserts are heated by steam.

9. The system as set forth in claim 1 wherein internal channels of the first inserts are heated by electricity.

10. A method for curing a portion of a tire assembly, the method comprising the steps of:
    coaxially securing a lower retainer plate to a lower actuator;
    coaxially securing a core to the lower retainer plate;
    coaxially securing a plurality of larger inserts and corresponding parts of the tire assembly to the lower retainer plate and the radially outer surface of the core;
    circumferentially securing a plurality of smaller inserts between the larger inserts and the corresponding parts of the tire assembly to the radially outer surface of the core;
    coaxially securing alternating larger and smaller inserts to an upper retainer plate;
    coaxially securing an upper actuator to the upper retainer plate;
    axially compressing alternating larger and smaller inserts and corresponding parts of the tire assembly between the lower actuator and the upper actuator, and further including the step of heating internal channels of the larger inserts.

11. The method as set forth in claim 10 further including the step of coaxially securing the upper retainer plate to alternating larger inserts and smaller inserts.

12. The method as set forth in claim 10 further including the step of radially and circumferentially securing the larger inserts and smaller inserts to the core.

13. The method as set forth in claim 10 further including the step of appropriately positioning the corresponding parts of the tire assembly relative to each other.

14. The method as set forth in claim 10 further including the step of applying heat to the core and the larger inserts.

15. The method as set forth in claim 10 further including the step of cooling the core and the larger inserts.

16. The method as set forth in claim 10 further including the step of axially releasing the upper actuator and the lower actuator.

17. The method as set forth in claim 10 further including the step of disengaging the upper actuator and the lower actuator from an axial placement shaft.

18. The method as set forth in claim 10 further including the step of revealing a cured single-piece structure made from cured together parts of the tire assembly.

* * * * *